(12) United States Patent
Denker

(10) Patent No.: US 6,997,123 B2
(45) Date of Patent: Feb. 14, 2006

(54) METHOD OF CONVERTING A MIXER-GRINDER UNIT INTO A SEED TENDER UNIT

(76) Inventor: Darrell Denker, 763 County Rd. No. 1, Oakland, NE (US) 68045-5050

( * ) Notice: Subject to any disclaimer, the term of this patent is extended or adjusted under 35 U.S.C. 154(b) by 50 days.

(21) Appl. No.: 10/818,082

(22) Filed: Apr. 5, 2004

(65) Prior Publication Data

US 2005/0217546 A1   Oct. 6, 2005

(51) Int. Cl.
 *A01C 1/00*   (2006.01)
(52) U.S. Cl. ......................... 111/200; 111/925
(58) Field of Classification Search ............... 111/200, 111/925, 173; 172/1, 776; 222/386, 390, 222/575; 221/1, 199; 29/560; 76/1
See application file for complete search history.

(56) References Cited

U.S. PATENT DOCUMENTS

| | | | | |
|---|---|---|---|---|
| 3,439,819 A | * | 4/1969 | Quanbeck | 414/526 |
| 3,780,993 A | * | 12/1973 | Kline | 366/157.1 |
| 4,026,528 A | * | 5/1977 | Kline et al. | 366/158.2 |
| 4,201,348 A | * | 5/1980 | Bigbee et al. | 241/101.76 |
| 4,311,282 A | * | 1/1982 | Howell | 241/56 |
| 4,432,499 A | * | 2/1984 | Henkensiefken et al. | 241/30 |
| 4,473,016 A | * | 9/1984 | Gust | 111/174 |
| 4,577,805 A | * | 3/1986 | Seymour | 241/101.8 |
| 5,257,893 A | * | 11/1993 | Sevits | 414/523 |
| 5,575,225 A | * | 11/1996 | Smith et al. | 111/174 |
| 5,785,481 A | * | 7/1998 | Ockels | 414/523 |

\* cited by examiner

*Primary Examiner*—Victor Batson
(74) *Attorney, Agent, or Firm*—Adam H. Jacobs

(57) ABSTRACT

A method of modifying a grinder-mixer unit into a seed tender unit includes the steps of providing a grinder having a frame, a generally upright bin, a mixing auger within the bin, a grinding device and an outlet device. The outlet device and the grinding device are removed from the frame. A seed output opening is formed in the bin and a false floor plate is mounted within the bin to direct seed towards the opening, and a seed transfer device having a lower end and an upper end is connected at the lower end to the seed output opening, a seed feed control device is interposed therebetween and the seed transfer device is connected to a power device for engaging the seed transfer device to transfer seed from the lower end to the upper end of the seed transfer device.

8 Claims, 3 Drawing Sheets

METHOD OF CONVERTING A MIXER-GRINDER UNIT INTO A SEED TENDER UNIT

BACKGROUND OF THE INVENTION

1. Technical Field

The present invention relates to methods of modifying farm equipment and, more particularly, to a method of modifying a grinder-mixer unit into a seed tender unit which includes the steps of providing the grinder, removing the mixing auger from the grinder bin, disconnecting the outlet device from the grinding device, removing the grinding device from the frame, forming a seed output opening in the bottom of the bin, mounting a false floor plate within the generally upright bin at an angle relative to horizontal, replacing the outlet device with an extended seed output auger, connecting the lower end of the seed output auger to the seed output opening and connecting the seed output auger to a power device for rotating the auger to transfer seed through the auger to a desired location.

2. Description of the Prior Art

Farmers are among the most important and least appreciated workers in the world. Without farmers, the vast majority of people on earth would be unable to feed themselves, yet the day-to-day sacrifices of the average American farmer are generally taken for granted by the rest of the population. Farming does not only involve physical hardships, but in recent years has involved an ever-increasing level of economic hardship. Whether this is due to depressed crop prices or any of several other factors is immaterial, as it is the mere fact that the average American farmer is hard-pressed to make ends meet which is of the utmost importance.

Because of these economic hardships, farmers have become quite adept at manufacturing their own equipment for use on the farm and/or modifying already existing equipment to perform another function. The list of such improvements is quite a long one, but could include such devices as those described in U.S. Pat. No. 4,166,351 issued to Nieuberg (an agricultural do-all machine) and in U.S. Pat. No. 6,098,722 issued to Richard (a versatile implement system). Such inventions as these have been invented by farmers to perform certain tasks and there are numerous examples of such devices found in the prior art. However, it is much more rare to find an invention in the prior art which renovates an obsolete piece of machinery and turns it into something that is very useful for the farmer. It is precisely this renovation of old machinery into new and useful machinery which results in great economic benefits for farmers, and thus allows them to invest more time, effort and money in improving crop production.

One particular piece of equipment which has become somewhat obsolete in the farming industry is the grinder-mixer unit (shown in FIG. 1, prior art) such as the grinder-mixer 358 unit manufactured by Sperry New Holland. The grinder-mixer unit is generally used to grind and mix livestock feed, and to mix various feed supplements such as vitamins or other medicines into the animal feed prior to giving the feed to the animal. With the decrease in the number of farmers who raise livestock, combined with the advent of feed mixtures produced by the manufacturer, the usefulness of the grinder-mixer unit has been greatly decreased and in many cases, the grinder-mixer unit remains unused by the farmer. This occurs in spite of the fact that the grinder-mixer unit is still operable and, with proper modification, could be used to perform other tasks. The unused machinery is then often sold at auction for pennies on the dollar, which benefits no one except the auctioneer. This then is an important need for the farmer, specifically, to renovate and resuscitate an already existing, somewhat obsolete piece of machinery and, by significantly modifying the unit, render it operable for a new task, one which will greatly assist the farmer in his or her daily duties. There is therefore a need for a method of modifying a grinder-mixer unit into a more useful piece of machinery.

Of the several jobs which must be performed by the farmer in raising crops each year, perhaps the most important and significant is the planting of the seed in the field to begin the crop growth process. Today, the vast majority of fields are planted by towing a seed planter behind a tractor, the seed planter dropping seed into the furrows created by the plows attached to the tractor to begin seed growth. The seed is generally stored within a number of large plastic bins towed behind the tractor, but it has been found that one of the most difficult tasks in performing the seed planting operation is in the filling of the bins with the seed. This must often be done by hand by the farmer lifting 50 pound bags of seed and emptying them one by one into the plastic seed bins. Large farming operations utilize specialized equipment for the loading of the seed into the bins, the equipment specifically being referred to as a seed tender. However, seed tender units are prohibitably expensive and are generally not purchasable by small to mid-size farmers, due to their excessive cost. However, modification of an already existing piece of machinery to replicate the operation of a seed tender unit would generally be within the financial capabilities of the average farmer and therefore there is a need for a method of modifying an already existing piece of equipment to replicate the operative characteristics of a seed tender unit.

Therefore, an object of the present invention is to provide a method of modifying a grinder-mixer unit into a seed tender unit.

Another object of the present invention is to provide a method of modifying a grinder-mixer unit into a seed tender unit which would include the steps of providing a grinder-mixer unit having a frame, at least two ground-engaging wheels pivotally mounted on the frame, a generally upright bin mounted on the frame for holding material, a mixing auger rotatably mounted within the bin, a grinding device mounted adjacent the bin on the frame and in material transfer connection therewith for grinding the material and a processed material outlet device connecting to the grinding device for outputting the material after grinding thereof.

Another object of the present invention is to provide a method of modifying a grinder-mixer unit into a seed tender unit which involves the further steps of removing the mixing auger from the bin, disconnecting the outlet device from the grinding device, removing the grinding device from the frame, forming a lowermost seed output opening in the bin and adding a false floor plate in the bin angled from horizontal such that seed contacts the false floor plate and slides or tumbles into the lowermost seed output opening.

Another object of the present invention is to provide a method of modifying a grinder-mixer unit into a seed tender unit which includes the further steps of replacing the outlet device with an extended seed output auger having a general cylindrical outer wall and a rotatably mounted center auger, a lower end for receiving seed therein and an upper end for outputting seed therefrom, connecting the lower end of the seed output auger to the lowermost seed output opening of the generally conical seed feed lower bin portion, providing a seed feed control device interposed between the bin and the seed output auger for alternatively permitting and restricting seed flow from the generally upright bin and finally, connecting the seed output auger to a power device for rotating the center auger to transfer seed from the lower end of the seed output auger to the upper end of the seed output auger for depositing seed in designated locations.

Another object of the present invention is to provide a method of modifying a grinder-mixer unit into a seed tender unit which will renovate the already existing, somewhat obsolete grinder-mixer unit into the far more useful seed tender unit without requiring significant financial or material output.

Another object of the present invention is to provide a method of modifying a grinder-mixer unit into a seed tender unit which may be performed by persons having reasonable manufacturing skills, thus permitting a diverse group of manufacturers to implement the method of the present invention to allow the greatest number of farmers to benefit from the method of the present invention.

Finally, an object of the present invention is to provide a method of modifying a grinder-mixer unit into a seed tender unit which is relatively simple and inexpensive to implement and which will result in a seed tender unit which is safe, efficient and effective in use.

SUMMARY OF THE INVENTION

The present invention provides a method of modifying a grinder-mixer unit into a seed tender unit including the steps of providing a grinder having a frame, at least two ground-engaging wheels rotatably mounted on the frame, a generally upright bin mounted on the frame for holding material, a mixing auger rotatably mounted within the bin, a grinding device mounted adjacent the generally upright bin on the frame in material transfer connection therewith for grinding the material and a processed material outlet device connected to the grinding device for outputting the material after grinding thereof and then removing the mixing auger from the generally upright bin. The outlet device would then be disconnected from the grinding device and the grinding device would be removed from the frame. A lowermost seed output opening is then formed in the bottom of the generally upright bin generally adjacent the base of the generally upright bin for release of seed from within the generally upright bin and a false floor plate is mounted within the generally upright bin, the false floor plate set at an angle relative to horizontal with the lowermost section of the false floor plate generally adjacent the lowermost seed output opening whereby seed within the generally upright bin is gravity-fed down the false floor plate towards the lowermost seed output opening. The outlet device is then replaced with a seed transfer device having a lower end for receiving seed therein and an upper end for outputting seed therefrom, the seed transfer device operative to move seed from the lower end to the upper end and the lower end of the seed transfer device is connected in seed transfer connection to the lowermost seed output opening formed in the generally upright bin. A seed feed control device is interposed between the generally upright bin and the lower end of the seed transfer device for alternately permitting and restricting seed flow from the generally upright bin and finally the seed transfer device is connected to a power device for engaging the seed transfer device to transfer seed from the lower end of the seed transfer device to the upper end of the seed transfer device for depositing seed into designated locations.

The present invention as this described provides a significant improvement over those seed tender units found in the prior art. Specifically, because the method of the present invention renovates an already-existing piece of equipment to construct the seed tender unit, it is far more cost-effective than purchasing a new seed tender unit and thus can be used by the vast majority of farmers who already own a grinder-mixer unit. Furthermore, because the method of modifying the grinder-mixer unit involves a discreet series of steps which are not overly difficult to implement, the method may be practiced on many different types of grinder-mixer units and thus may be used by many farmers. Also, because the method of the present invention modifies a generally obsolete piece of machinery into a highly useful piece of machinery, redundancy and waste are generally eliminated and efficiency and frugality are promoted. Finally, the inexpensive availability of a seed tender unit for small to mid-size farmers will greatly reduce the injuries incurred by farmers due to the lifting of the seed bags, among other benefits, and this will result in increased efficiency for the small to mid-size farmer thus allowing them to compete on more even terms with large-scale farming operations. The method of the present invention thus provides a significant improvement over those methods and devices found in the prior art.

DESCRIPTION OF THE PREFERRED EMBODIMENT

Figure 1:
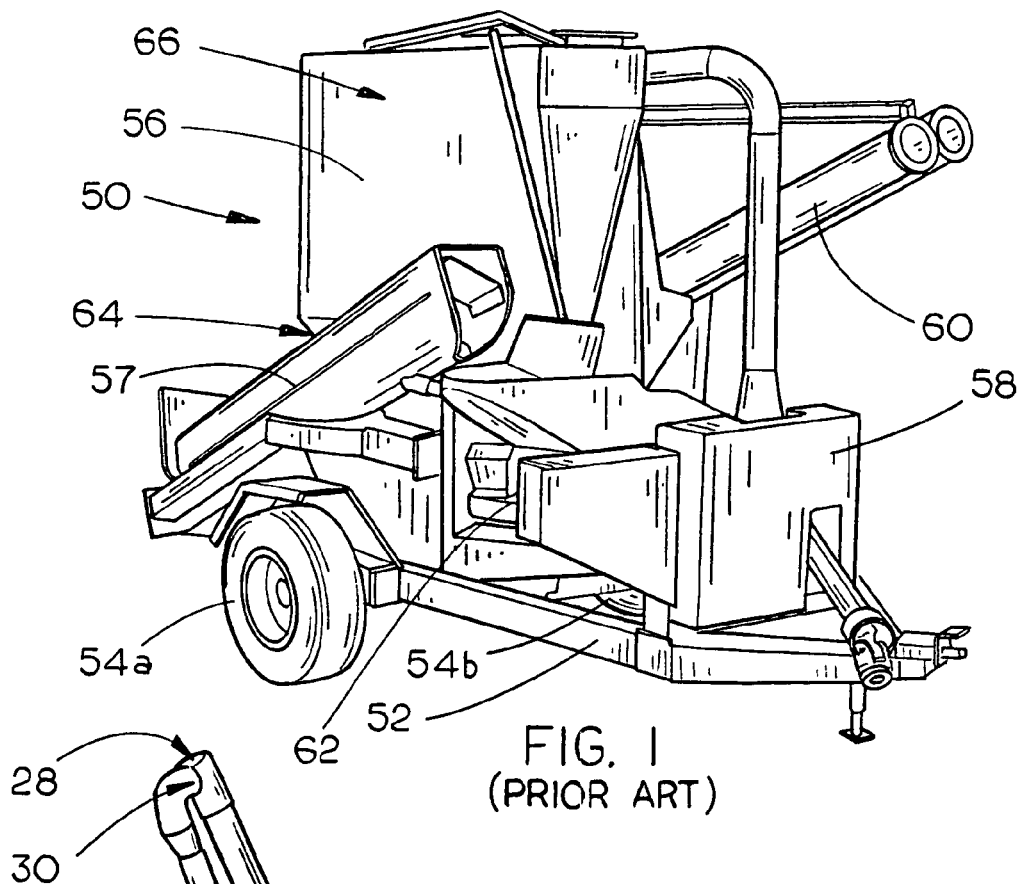
FIG. 1 is a side elevational view of a grinder-mixer unit such as those found in the prior art.
Figure 2:
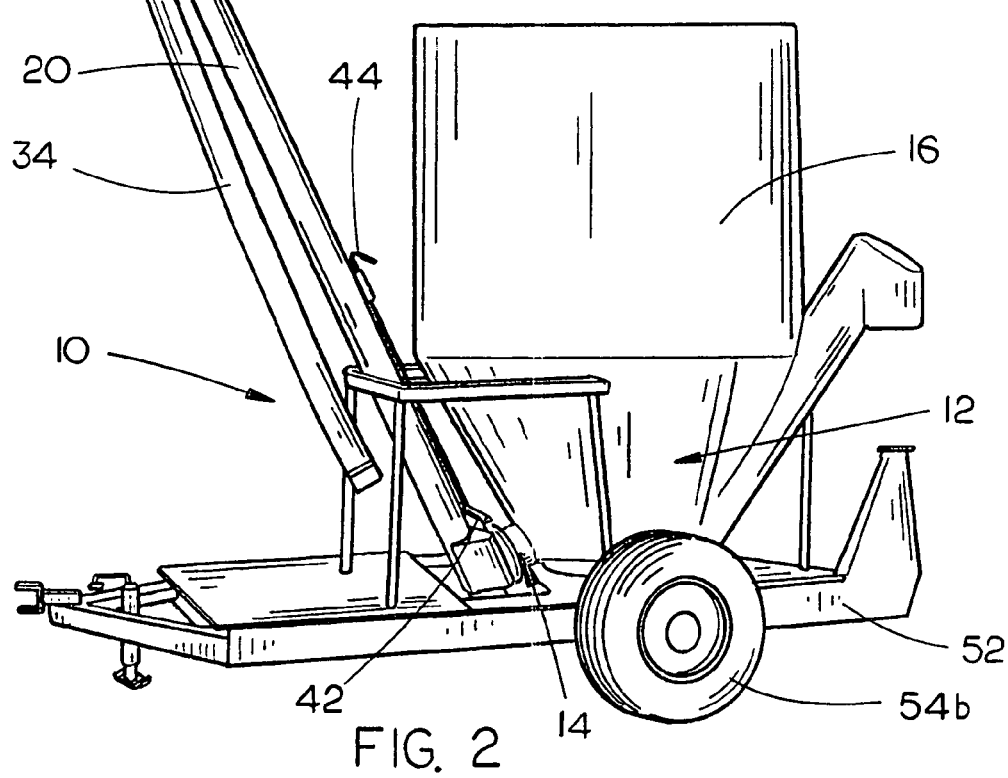
FIG. 2 is a perspective view of the modified seed tender unit resulting from the implementation of the method of the present invention.

The method of modifying a grinder-mixer unit into a seed tender unit of the present invention is shown best in FIGS. 2–4d as including a series of steps which will modify the grinder-mixer unit into the completed seed tender unit. The initial step of the present invention involves the providing of a grinder-mixer unit 50, shown best in FIG. 1, which would preferably include a frame 52, wheels 54a and 54b, a generally upright bin 56 mounted on the frame 52, an input auger 57 used to feed material into the grinder, a grinding device 58 mounted adjacent the generally upright bin 56 and in material transfer connection therewith via a feed auger 62 and finally would include a processed material outlet device such as an output auger 60 or the like which takes the processed material from the generally upright bin 56 and transfers it to the appropriate location. While it should be noted that there are numerous different types of grinder-mixer units 50 which are produced by various manufacturers, all of the units include similar features such as those described above and as the method of the present invention involves modification to the generally upright bin 56 primarily, it is believed that the method of the present invention is adaptable to virtually any type of grinder-mixer unit 50, regardless of the manufacturer.

Mounted within the generally upright bin 56 on the grinder-mixer unit 50 is an upright mixing auger 61 which, in the grinder-mixer unit 50, is designed to mix the feed within the generally upright bin 56 into a generally homogeneous mixture prior to release of the feed mixture into the output auger 60. The initial step of the method of the present invention is to remove this mixing auger 61 from the generally upright bin 56 thus leaving the generally upright bin 56 substantially empty. Also, the feed auger 62 must be removed from the generally upright bin 56, and as the feed auger 62 extends between the generally upright bin 56 and the grinding device 58, in many situations, the feed auger 62 can be removed only after the grinding device 58 is tilted to one side or completely removed. It should be noted, however, that the exact procedure for removal of the mixing auger 61 will be modified according to the type of grinder-mixer unit 50 which is being modified. This then prepares the generally upright bin 56 for receipt of the seed to be dispensed therefrom once the modifications to the grinder-mixer unit 50 are completed.

The second step of the method of the present invention is to disconnect the input auger 57 and the output auger 60 from the grinding device 58 and generally upright bin 56 and remove the input auger 57 and the output auger 60 from the frame 52. The grinding device 58 would also be removed from the frame 52 as the grinding device 58 will not be necessary for use with the seed tender unit, and this will lighten the unit to facilitate transport of the completed seed tender unit.

With these modifications to the grinder-mixer unit 50 having been completed, the significant modifications to the generally upright bin 56 are now commenced, as shown best in FIGS. 4a, 4b, 4c and 4d. In the initial step of modifying the generally upright bin 56, the now-empty generally upright bin 56 is accessed from the side thereof and a lowermost seed output opening 14 is formed in the outer wall of the lower section 64 as shown best in FIG. 4b. The lowermost seed output opening 14 extends through the side wall of the generally upright bin 56, is formed via cutting with a cutting torch, arc cutter or the like and functions to permit seed housed within the generally upright bin 56 to exit the bin through the lowermost seed output opening 14. In the preferred embodiment, the lowermost seed output opening 14 would include an outwardly-projecting seed feed cylinder which is welded over the hole formed in the side wall of the generally upright bin 56, although the exact size and shape of the lowermost seed output opening 14 is not critical to the present invention so long as the lowermost seed output opening 14 is capable of releasing the seed within the generally upright bin 56.

Figure 4A:
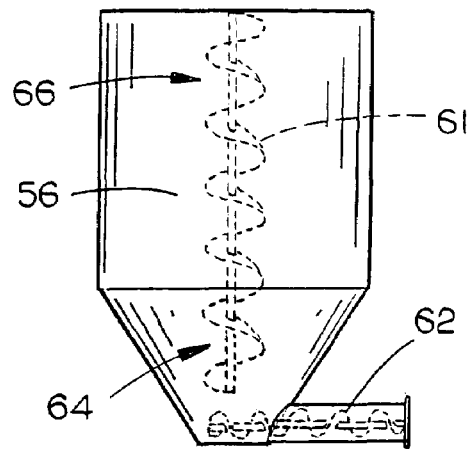
FIGS. 4a, 4b, 4c and 4d illustrate the further steps of the method of the present invention.
Figure 4B:
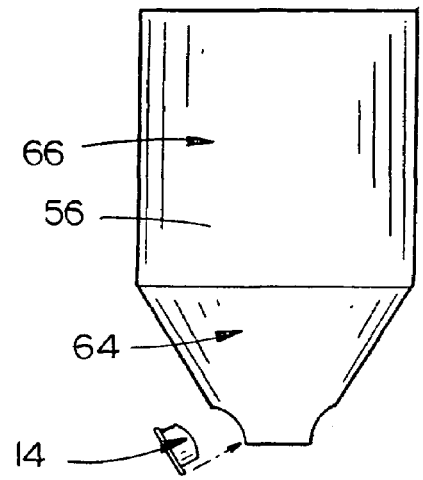
Figure 4C:
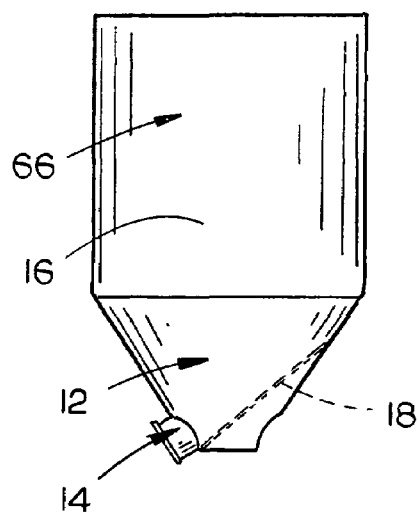

The next step of the method of the present invention is shown in FIG. 4c and includes the mounting of a generally oval false floor plate 18 within the lower section 64 of generally upright bin 56. As shown, the generally upright bin 56 would include a generally cylindrical upper section 66 and a generally conical lower section 64, with the lower section 64 including an auger entry hole where the feed auger 62 extended into the generally upright bin 56. The false floor plate 18 is preferably constructed of steel plate and is mounted within the lower section 64 at an upwards angle above the original floor 13 of the generally upright bin 56 with the lower section of the false floor plate 18 generally adjacent the lowermost seed output opening 14 and the upper section of the false floor plate 18 connected to the opposite side of the generally upright bin 56. Due to the shape of the false floor plate 18, the false floor plate 18 completely covers and closes the lowermost section of the generally upright bin 56 and thus seals the auger entry hole in the generally upright bin 56 which remains when the feed auger 62 is removed from the generally upright bin 56. The only exit for the seed held within the generally upright bin 56 is thus through the lowermost seed output opening 14. Furthermore, due to the fact that the false floor plate 18 is angled at approximately 20° to 45° from horizontal, seed which contacts the false floor plate 18 is fed by gravity downwards towards the lowermost seed output opening 14 and thus out of the generally upright bin 56. Without the installation of the false floor plate 18, the generally upright bin 56 will not completely empty the seed held therewithin, and the user of the present invention would thus have to manually remove the remaining seed, which would greatly reduce the efficiency of the present invention and thus is undesirable.

Figure 3:
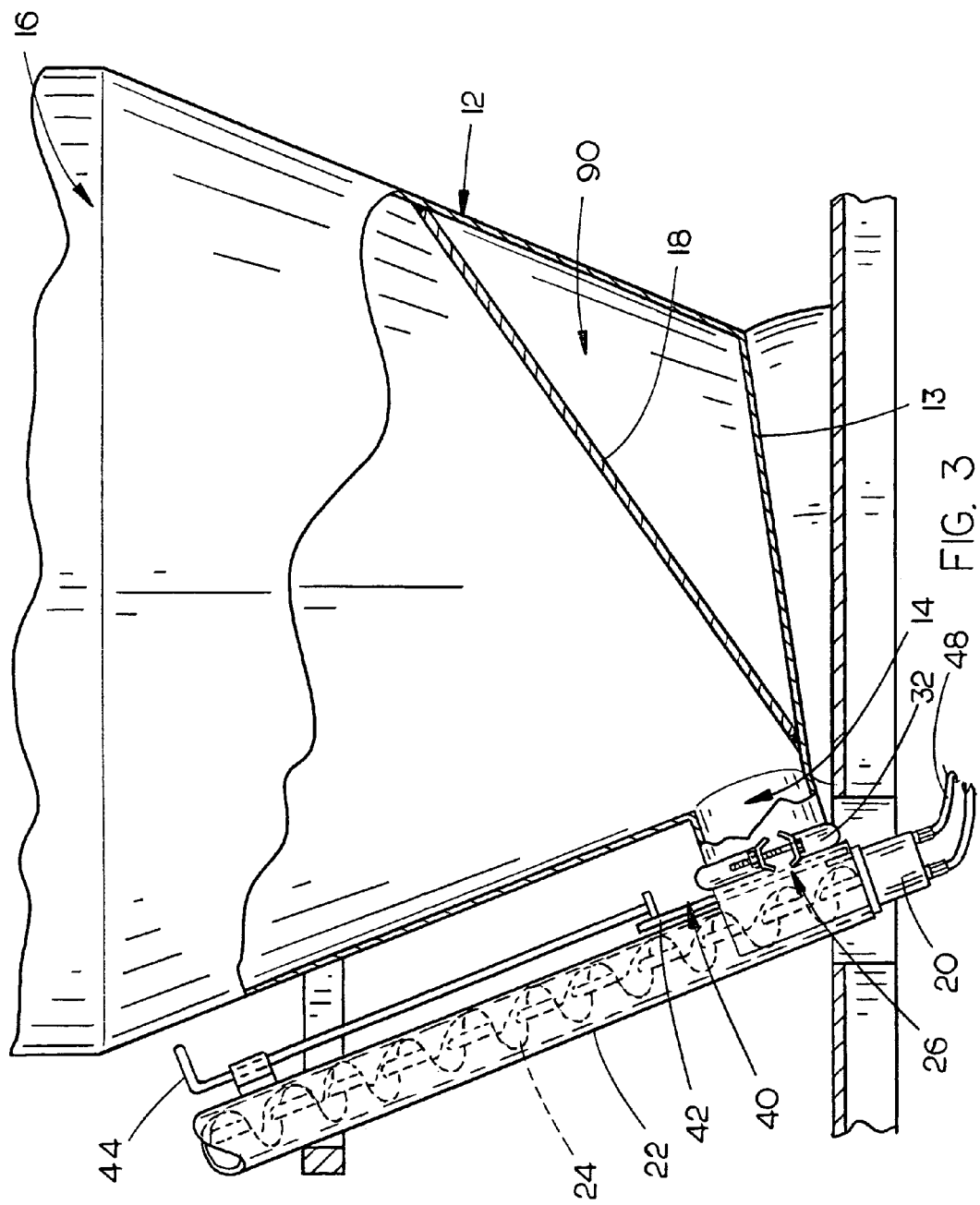
FIG. 3 is a detailed side elevational view of the lower section of the seed tender unit showing the lowermost seed output opening and auger connection.
Figure 4D:
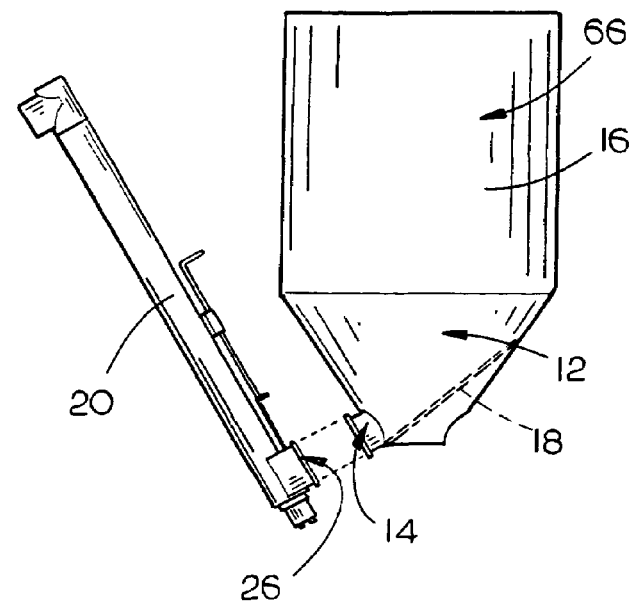

As shown best in FIG. 4d, the next step of the method of the present invention is to provide a seed transfer device such as a seed output auger 20 having a generally cylindrical outer wall 22 and a rotatably mounted center auger 24 which would then be connected to the lowermost seed output opening 14 of the modified lower bin portion 12 of modified generally upright bin 16 as shown best in FIG. 3. In the preferred embodiment, seed output auger 20 would include a lower opening 26 for receiving seed therein and an upper end 28 having a seed output opening 30, as shown best in FIGS. 2 and 4. Once the lower opening 26 of seed output auger 20 is rotatably connected to lowermost seed output opening 14 of modified lower bin portion 12, the modifications are generally completed, and the seed tender unit 10 is finished, as shown best in FIG. 2.

As shown best in FIG. 3, the false floor plate 18 of the modified lower bin portion 12 is operative to "funnel" the seed stored in the modified generally upright bin 16 towards the lowermost seed output opening 14. The release of substantially all of the seed held therewithin is thus ensured, and the seed 90 exits through lowermost seed output opening 14 for transfer via seed output auger 20 to the appropriate desired location.

One reasonably important feature of the present invention is the rotating collar connection 32 of lower opening 26 of seed output auger 20 to lowermost seed output opening 14 of modified lower bin portion 12, as shown best in FIGS. 3 and 4d. This rotating collar 32 permits the seed output auger 20 to be rotated left and right relative to modified generally upright bin 16 and frame 52 to allow output of the seed 90 housed within modified generally upright bin 16 to locations on either side of the frame 52 of the seed tender unit 10. Of course, the use of the rotating collar 32 is not critical to the present invention, but it has been found that the use of such a rotating collar permits greater flexibility in the use of the seed tender unit 10 of the present invention. Also, it should be noted that other types of connections such as universal joints and the like may be used with the method of the present invention, any of which would be understood by those skilled in the art.

Mounted on and extending outwards from upper end 28 of seed output auger 20 is a seed outlet tube 34 which is in material transfer connection with the seed output opening 30 of upper end 28 of seed output auger 20. The seed output tube 34 is preferably a flexible hose which can be aligned with the location into which the seed is to be deposited prior to engagement of the seed output auger 20 to transfer seed from the modified generally upright bin 16 through the seed output tube 34. Of course, the precise size, shape and nature of the seed output tube 34 is not critical to the present invention so long as the intended functionality of the seed output tube 34 is maintained, namely, permitting the proper placement of seed via the seed tender unit 10 of the present invention.

Another step of the present invention is to provide a seed feed control device 40 interposed between the modified lower bin portion 12 and the seed output auger 20 for alternately permitting and restricting seed flow from the modified generally upright bin 16 into the seed output auger 20. In the preferred embodiment, the seed feed control device 40 would be a metal plate 42 which is slidably mounted between the lowermost seed output opening 14 of modified lower bin portion 12 and the lower opening 26 of seed output auger 20 as shown best in FIG. 3. The metal plate 42 is mounted on the seed output auger 20 or on the modified lower bin portion 12 such that when the metal plate 42 is slid downwards, seed flow between lowermost seed output opening 14 and lower opening 26 is prevented and when the metal plate 42 is raised via handle 44, seed flow between the lowermost seed output opening 14 and lower opening 26 is permitted. Of course, other types of seed feed control devices 40 may be incorporated and used with the present invention, but it has been found that the simple and effective use of the metal plate 42 as thus described performs all of the necessary functions of restricting and permitting seed flow.

The final step of the method of the present invention is to connect the seed output auger 20 via hydraulic hoses 48 to a power device such as an hydraulic motor or other such motor device which will rotate the center auger 24 within generally cylindrical outer wall 22 to transport seed upwards though seed output auger 20 to the upper end 28 thereof and out of seed output opening 30. The seed then falls through seed output tube 34 into the desired location for the transferred seed. Once the seed output auger 20 has been connected to the power device, the modification of the grinder-mixer unit 50 into the seed feeder unit 10 is substantially completed and what was once a generally obsolete piece of machinery is now rendered an extremely useful one, which will provide much-needed assistance to the farmer during the seed planting process.

In use, the completed seed tender unit 10 would be used similarly to any standard type of seed tender unit in that a quantity of seed 90 would be placed within the modified generally upright bin 16. As the bin 16 can hold a large amount of seed, the farmer may go directly to a bulk seed sales location for his or her seed, thus getting a discounted price for the seed and engendering further savings of time and money. Once the seed is placed within the modified generally upright bin 16, gravity causes the seed to move into lowermost seed output opening 14 of modified lower bin portion 12 along the false floor plate 18 and once the seed feed control device 40, namely metal plate 42, is moved upwards to permit seed flow through the lowermost seed output opening 14, the transfer of seed from the modified generally upright bin 16 into seed output auger 20 is begun. As the center auger 24 of seed output auger 20 rotates, the seed 90 is transferred from the lower opening 26 of seed output auger 20 to the upper end 28 of seed output auger 20 and out of seed output opening 30 where the seed 90 falls through seed output tube 34 into the desired transfer location for the seed 90, with the lower end of the seed output tube 34 being positioned adjacent the desired transfer location. When the desired amount of seed 90 has been transferred to the desired location, the metal plate 42 of seed feed control device 40 is moved downwards to restrict seed flow through the lowermost seed output opening 14 and the entire process may be begun again to quickly and easily transfer seed 90 from the modified generally upright bin 16 to the desired transfer seed location.

It is to be understood that numerous additions, modifications and substitutions may be made to the method of modifying a grinder-mixer unit into a seed tender unit of the present invention which fall within the intended broad scope of the appended claims. For example, the steps involved in modifying the grinder-mixer unit may be changed slightly and even reordered so long as the steps are preformed to take the grinder-mixer unit and modify it into an eminently usable seed tender unit. Furthermore, the precise size, shape and construction methods and materials used in connection with the method of the present invention are not critical so long as the steps of the method are performed and the resulting seed tender unit performs its intended functions. Also, although the present invention has been described as incorporating a seed output auger 20, other types of seed transfer devices and power devices may be incorporated or used with the present invention so long as the intended function of transferring seed from the lowermost seed output opening 14 to the seed output tube 34 is performed. Finally, minor modifications to the method of the present invention are hereby incorporated into this description, depending on the specific model of grinder-mixer unit which is to be modified into the seed tender unit.

There has therefore been shown and described a method of modifying a grinder-mixer unit into a seed tender unit which accomplishes at least all of its intended objectives.

I claim:

1. A method of modifying a grinder-mixer unit into a seed tender unit comprising the steps:

providing a grinder-mixer unit having a frame, at least two ground-engaging wheels rotatably mounted on said frame, a generally upright bin having a base, said generally upright bin mounted on said frame for holding material, a mixing auger rotatably mounted at least partially within said bin, a grinding device mounted adjacent said generally upright bin on said frame in material transfer connection therewith for grinding the material and a processed material outlet device connected to the grinding device for outputting the material after grinding thereof;

removing said mixing auger from said generally upright bin;

forming a lowermost seed output opening in said generally upright bin generally adjacent the base of said generally upright bin for release of seed from within said generally upright bin;

mounting a false floor plate within said generally upright bin, said false floor plate set at an upward angle relative to horizontal with a lowermost section of said false floor plate generally adjacent said lowermost seed output opening whereby seed within said generally upright bin is gravity-fed down said false floor plate towards said lowermost seed output opening;

replacing said outlet device with a seed transfer device having a lower end for receiving seed therein and an upper end for outputting seed therefrom, said seed transfer device operative to move seed from said lower end to said upper end;

connecting said lower end of said seed transfer device to said lowermost seed output opening formed in said generally upright bin;

providing a seed feed control device interposed between said generally upright bin and said lower end of said seed transfer device for alternately permitting and restricting seed flow from said generally upright bin; and connecting said seed transfer device to a power device for engaging said seed transfer device to transfer seed from said lower end of said seed transfer device to said upper end of said seed transfer device for depositing seed into designated locations.

2. The method of claim 1 wherein said seed transfer device further comprises an extended seed output auger having a generally cylindrical outer wall and a rotatably mounted center auger, a seed output auger lower end for receiving seed therein and a seed output auger upper end for outputting seed therefrom, said center auger operative to rotate and move seed from said seed output auger lower end to said seed output auger upper end.

3. The method of claim 1 further comprising the step of disconnecting said outlet device from said grinding device.

4. The method of claim 3 further comprising the step of removing said grinding device from said frame.

5. The method of claim 1 wherein said step of forming a lowermost seed output opening in said generally upright bin generally adjacent the base of said generally upright bin further comprises mounting an outwardly-projecting seed feed cylinder on the outer wall surface of said generally upright bin such that seed is directed therethrough.

6. A method of modifying a grinder-mixer unit into a seed tender unit comprising the steps:

providing a grinder-mixer unit at least having a frame, a generally upright bin having an outer wall surface and a base said generally upright bin mounted on said frame for holding material and a mixing auger rotatably mounted at least partially within said bin;

removing said mixing auger from said generally upright bin;

forming a lowermost seed output opening in said generally upright bin generally adjacent the base of said generally upright bin for release of seed from within said generally upright bin;

mounting a false floor plate within said generally upright bin, said false floor plate mounted at an upward angle relative to horizontal, said false floor plate generally adjacent said lowermost seed output opening whereby seed within said generally upright bin is gravity-fed down said false floor plate towards said lowermost seed output opening;

providing a seed transfer device having a lower end for receiving seed therein and an upper end for outputting seed therefrom, said seed transfer device operative to move seed from said lower end to said upper end;

connecting said lower end of said seed transfer device to said lowermost seed output opening formed in said generally upright bin;

providing a seed feed control device interposed between said generally upright bin and said lower end of said seed transfer device for alternately permitting and restricting seed flow from said generally upright bin; and connecting said seed transfer device to a motor device for engaging said seed transfer device to transfer seed from said lower end of said seed transfer device to said upper end of said seed transfer device for depositing seed into designated locations.

7. The method of claim 6 wherein said seed transfer device further comprises an extended seed output auger having a generally cylindrical outer wall and a rotatably mounted center auger, a seed output auger lower end for receiving seed therein and a seed output auger upper end for outputting seed therefrom, said center auger operative to rotate and move seed from said seed output auger lower end to said seed output auger upper end.

8. The method of claim 6 wherein said step of forming a lowermost seed output opening in said generally upright bin generally adjacent the base of said generally upright bin further comprises mounting an outwardly-projecting seed feed cylinder on the outer wall surface of said generally upright bin such that seed is directed therethrough.

* * * * *